(12) United States Patent
Tanner

(10) Patent No.: US 8,811,459 B1
(45) Date of Patent: Aug. 19, 2014

(54) ROBUST AND SIMPLE TO CONFIGURE CABLE-REPLACEMENT SYSTEM

(71) Applicant: Matthew A. Tanner, Rancho Santa Margarita, CA (US)

(72) Inventor: Matthew A. Tanner, Rancho Santa Margarita, CA (US)

(73) Assignee: OleumTech Corporation, Irvine, CA (US)

( * ) Notice: Subject to any disclaimer, the term of this patent is extended or adjusted under 35 U.S.C. 154(b) by 0 days.

(21) Appl. No.: 14/058,846

(22) Filed: Oct. 21, 2013

(51) Int. Cl.
*H04B 1/38* (2006.01)
*H04L 5/16* (2006.01)
*H04L 12/56* (2006.01)

(52) U.S. Cl.
CPC .................... *H04L 49/254* (2013.01)
USPC ............ 375/220; 375/219; 375/221; 375/222

(58) Field of Classification Search
CPC ....... H04L 67/38; H04M 1/738; H04W 88/06
USPC .................. 375/220, 221, 358, 219
See application file for complete search history.

(56) References Cited

U.S. PATENT DOCUMENTS

| | | | |
|---|---|---|---|
| 7,149,474 B1* | 12/2006 | Mikhak | 455/41.2 |
| 7,319,406 B2 | 1/2008 | Vazach et al. | |
| 8,369,830 B2 | 2/2013 | Sperti et al. | |
| 2008/0066181 A1* | 3/2008 | Haveson et al. | 726/26 |
| 2009/0286489 A1* | 11/2009 | Racherla et al. | 455/74.1 |
| 2012/0071095 A1* | 3/2012 | Sims et al. | 455/41.2 |

FOREIGN PATENT DOCUMENTS

WO WO2013053714 A1 4/2013

OTHER PUBLICATIONS

ReFlexIO Wireless Cable Replacement System; http://www.ioselect.com/industrial-wireless-reflexio.html; downloaded Nov. 1, 2013 4:39 PM PT.
Limitless WDRR wireless DIN-Rail receiver; http://sensing.honeywell.com/limitless%20products%20-%20products?document=1&re_id=0; downloaded Jan. 1, 2013 4:30 PM PT.
K. Koumpis et al;"Wireless Industrial Control and Monitoring beyond Cable Replacement", journal article, Jun. 2005, 7pages, PROFIBUS International Conference, Coombe Abbey, UK.
WirelessHART Wireless Input/Output (I/O); http://www.cooperindustries.com/content/public/en/bussman/wireless/products/ . . . .

* cited by examiner

*Primary Examiner* — Qutbuddin Ghulamali
(74) *Attorney, Agent, or Firm* — Morland C. Fischer

(57) ABSTRACT

In a modular signal mirroring system each point-to-point RF transceiver end has a controller module coupled to one or more I/O modules. The I/O modules have various input and output circuits. A signal received at the near end is reconstructed at the far end after being transmitted in an RF packet. The reconstructed signal may be the same as the input signal, inverted from the input signal or level-shifted from the input signal. It is representative of the input signal following the input signal's state after a time-quantization latency. Transmission between the two ends is via a periodic transmission controlled in a master slave protocol. If a transmission is not received in a timely manner or, in some systems, if intentional interference with transmissions is detected, the reconstructed signal is forced to a safe state determined by local switch settings. The settings include the last known good state.

20 Claims, 10 Drawing Sheets

ROBUST AND SIMPLE TO CONFIGURE CABLE-REPLACEMENT SYSTEM

BACKGROUND OF INVENTION

1. Field

This disclosure relates to transmitting and receiving the state of electrical signals via a point-to-point radio frequency link; more specifically to radio-based cable replacement systems.

2. Background Art

Industrial facilities often have sensors and controllers that are remote from a central monitoring and control station. This can be in power plants, petroleum, and chemical operations as well as many others. Typically, long electrical cables convey the signals between remote locations and a control room. There are now many devices known that reduce the amount and length of cabling by using a network, particularly a radio frequency based network, to convey signals. In these systems a device at one end receives several electrical inputs, determines their states and transmits the state information to a distant unit. The distant unit receives the data, and based on it, sets its several outputs to correspond to the state of the first unit's inputs, thereby acting as a cable replacement. Signals can be from the field to a control room, from a control room to a remote location, or otherwise at a distance from each other. Many of these systems are susceptible to issues and disadvantages including complexity of configuration, unpredictable latencies, single points of failure, and difficulty in diagnosing problems.

Some of those issues and disadvantages are radio interference, failure in the firmware or hardware of the end-point devices, network failure, and loss of power to the devices. Inevitably some degree of increased latency is also introduced.

Other disadvantages can include ease of configuration. While running a long cable can be challenging in some locations, there is no configuration involved other than determining which conductor at one end corresponds to which conductor at the other end. In contrast, radio-frequency network-based cable replacement systems usually require downloading software from the manufacturer's web site, using a computer in the field to download settings to each unit, and many more steps. While growing in use, these systems can benefit from simpler configuration and more robust and diagnosable radio linkages.

BRIEF SUMMARY OF THE INVENTION

One end of a transmitter/receiver pair in a point-to-point radio frequency connection can characterize the state of an electrical input signal and transmit a block of information including a field of data representative of that state. The other, receiving, end can receive that block of information and can detect if the block of information represents a valid and un-interfered with transmission. It can then recreate the state of the original input signal conveyed in the data field on a mirrored local output circuit. Alternatively, the receiving end can set the output circuit to a predetermined state mapped from the data field, possibly inverting the signal or translating it to an alternate signaling scheme.

In cases where the received transmission or data within a transmission is determined to be invalid, corrupt, un-timely in arriving, jammed, etc., the receiver can cause its outputs to be forced to a predetermined default "fail-safe" state. This state can be separately settable for each output and each output's default state can be determined by settings of physical switches used as inputs to signify choices among predetermined rules.

In some embodiments, the paired end units can be transceivers with both ends having inputs and outputs, providing a bidirectional operation. Although the end units making up the pair can be very similar, the system can be configured in a master/slave arrangement with each respective unit operating according to a distinct programming. Among other ways of pairing transceivers they can be automatically paired before being shipped. This includes loading the mate's radio address and cryptographic keys in the units.

BRIEF DESCRIPTION OF THE DRAWINGS

The present disclosure will become better understood when the following detailed description is read with reference to the accompanying drawings in which like reference designators represent like parts throughout the drawings, wherein.

DETAILED DESCRIPTION OF THE INVENTION

Structure

Figure 1:
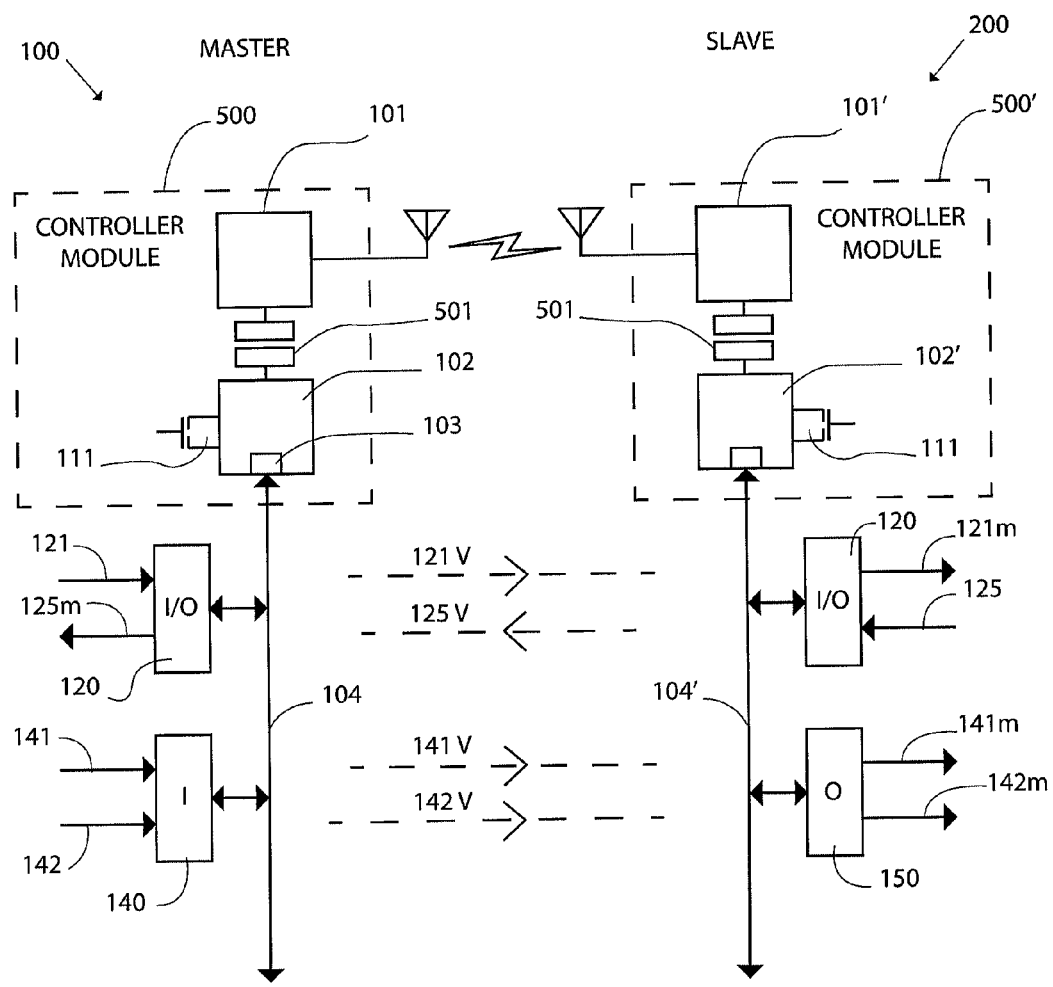
FIG. 1 shows a simplified block diagram of a first embodiment of a master/slave, paired, mirrored I/O, wireless cable replacement system.

Reference numerals are used to designate portions and aspects of the system. The same portion or aspect used in various positions and contexts will retain the same reference number. Due to the many symmetric aspects of the end points there are many cases of an instance of a system portion that is duplicated but operates in a distinct mode. In those cases the numeral has a prime mark.

FIG. 1 shows a simplified block diagram of an example wire-to-wireless-to-wire system. In this simplified example for clarity, only two I/O modules are associated with each end-point. Also, only two electrical signals are shown with each I/O module. The master side 100 has a radio module 101 coupled to a controller module 102 that are commonly packaged 500. The controller has a UART 103 that is used as a local communication channel to multiple I/O modules 120, 140.

One I/O module 120 has one input labeled 121 and one output labeled 125M. During operation, the system acts to reflect, or mirror, the state of input 121 to the output 121M in the slave system 200 and also to reflect the state of slave side input signal 125 to the master side output 125M. Dashed lines 121V, 125V illustrate the virtual transfer of these signals from end to end.

The slave end 200 has a radio module of the same type as the master's coupled to a controller 101'. The controller is physically the same type of unit as the master-side controller but programmed or configured to carry out the role of slave. Similar to the master side, the radio and controller are commonly packaged and the controller communicates over a multi-drop, sub-system, inter-connect RS-485 bus 104' to connected I/O modules. The first I/O module on the slave 120 side is the same type as the first module 121 on the master side. It has one input and one output. The second module 150 is not the same type as the master side's second module 140, however they are complimentary. The master side's two inputs 141 and 142 are reflected to the slave side's two outputs 141M and 142M. Specifically, the second I/O module 140 on the master side has only inputs; they are labeled 141 and 142. The operation of the system results in their states being reflected to the slave side's outputs labeled 141M and 142M. Dashed lines 141V and 142V illustrate the virtual transfer of these signals from master end to slave end.

Figure 2:
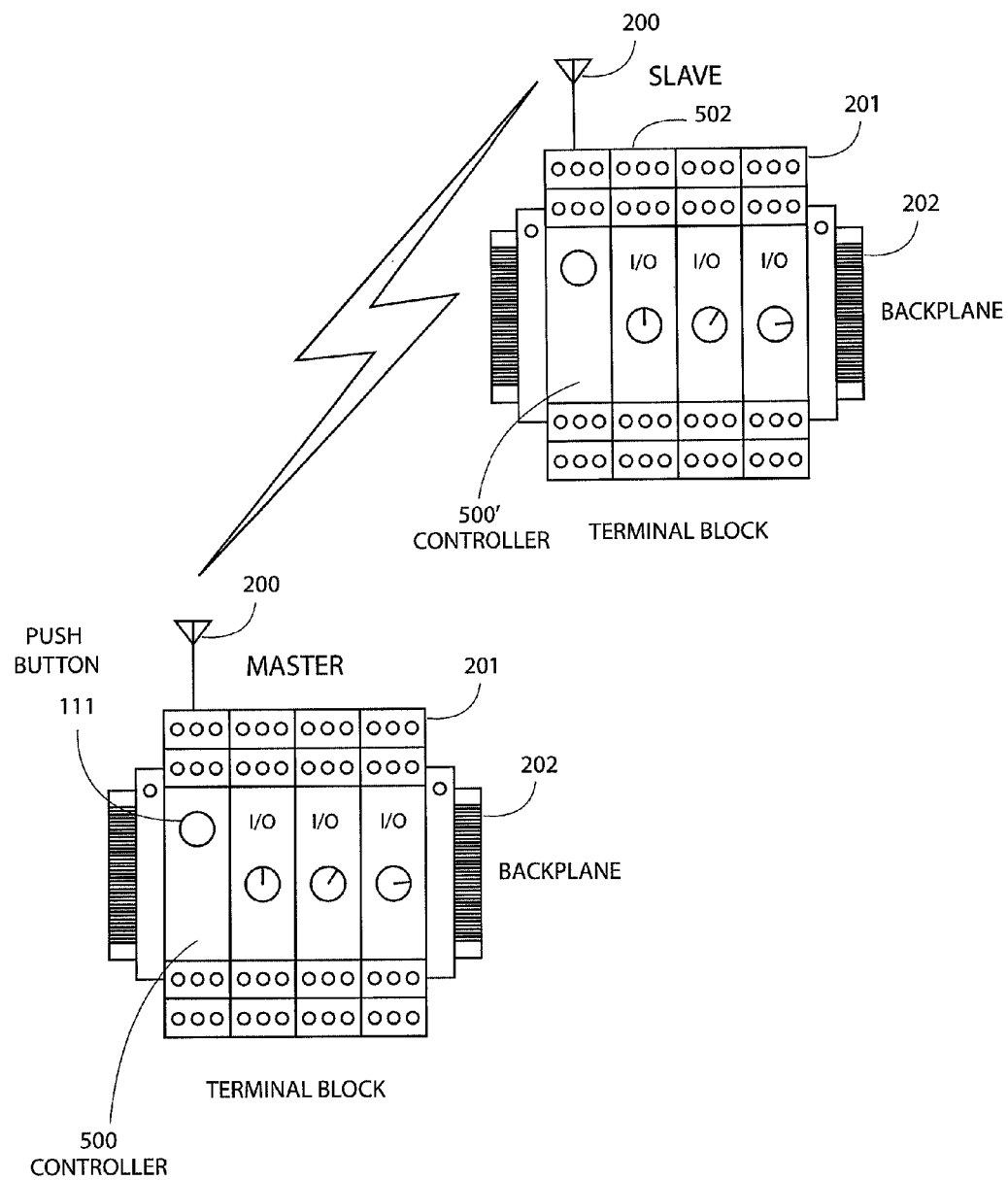
FIG. 2 shows a physical view of the paired system of FIG. 1.

The physical packaging of these modules is shown in FIG. 2. The modules are supported by mechanical connection to a DIN 15 rail. The rail has a passive backplane 202 to carry the RS-485 bus among the modules. The left side of each subsystem has a module 500, 500' containing the controller and radio subsystems. The other two modules are I/O modules. As shown, they are a four-input/four-output module and an eight-input module. Terminal blocks 201 for the electrical connections are on the top and bottom of the I/O modules and an antenna 200 can be local to the controller module.

Figure 3:
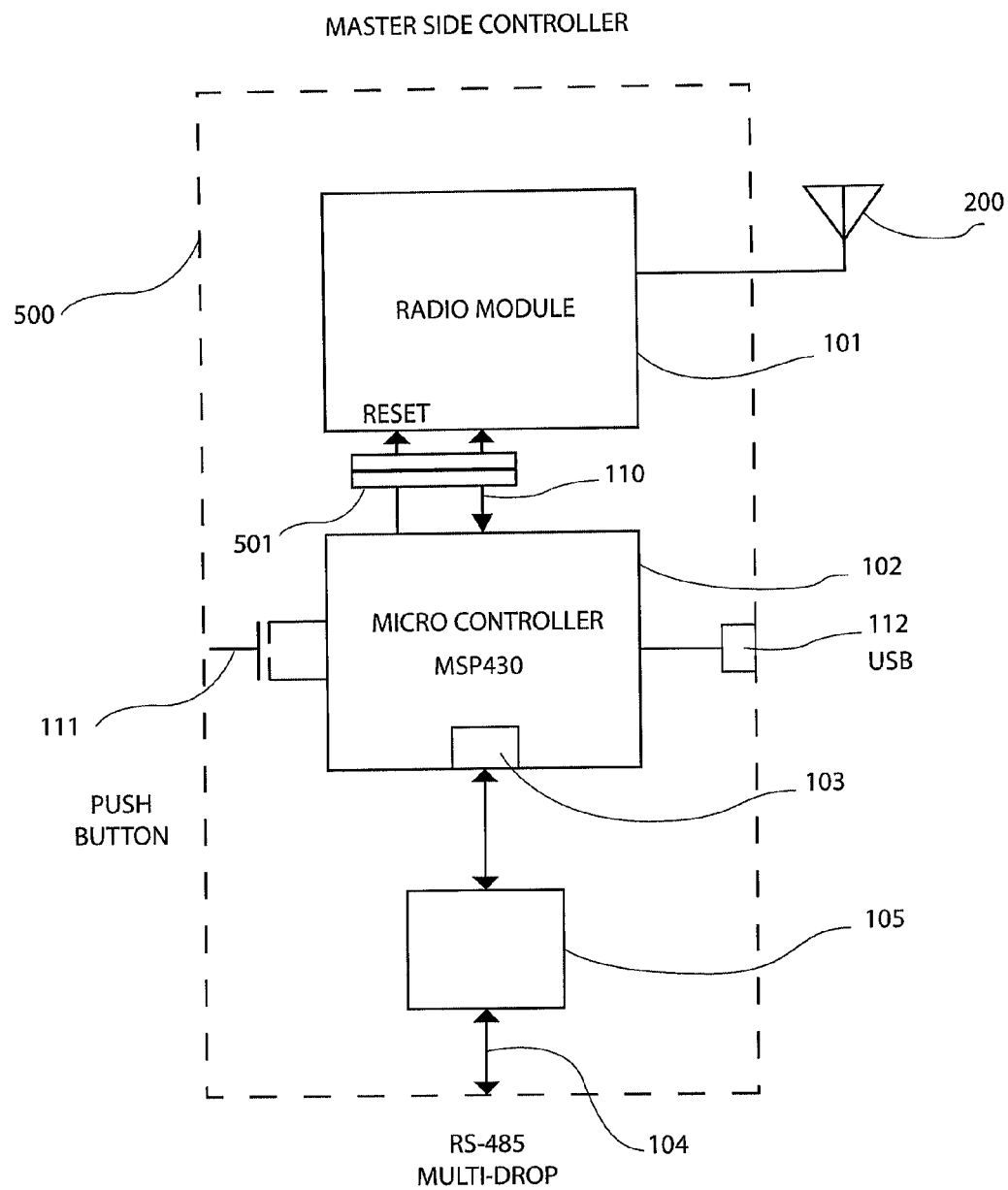
FIG. 3 shows a simplified block diagram of the controller/radio module shown in FIG. 1.

The next two figures show block diagrams of particular modules in more detail. FIG. 3 is a block diagram of the controller and radio module. The radio module 101 in this case is a Digi International XBee-Pro spread spectrum version operating in the scientific and industrial 900 MHz band. The operation of the controller is firmware embedded in a MSP430 microcontroller 102. The microcontroller connects to the Digi radio via a serial port 110 through a radio module port 501. The second serial port of the MSP430 is used for the multi-drop, sub-system, inter-connect bus 104 after being level-translated by circuitry 105 to RS-485 signal. The unit also has a push button 111, a USB port 112, and several indicators.

Figure 4:
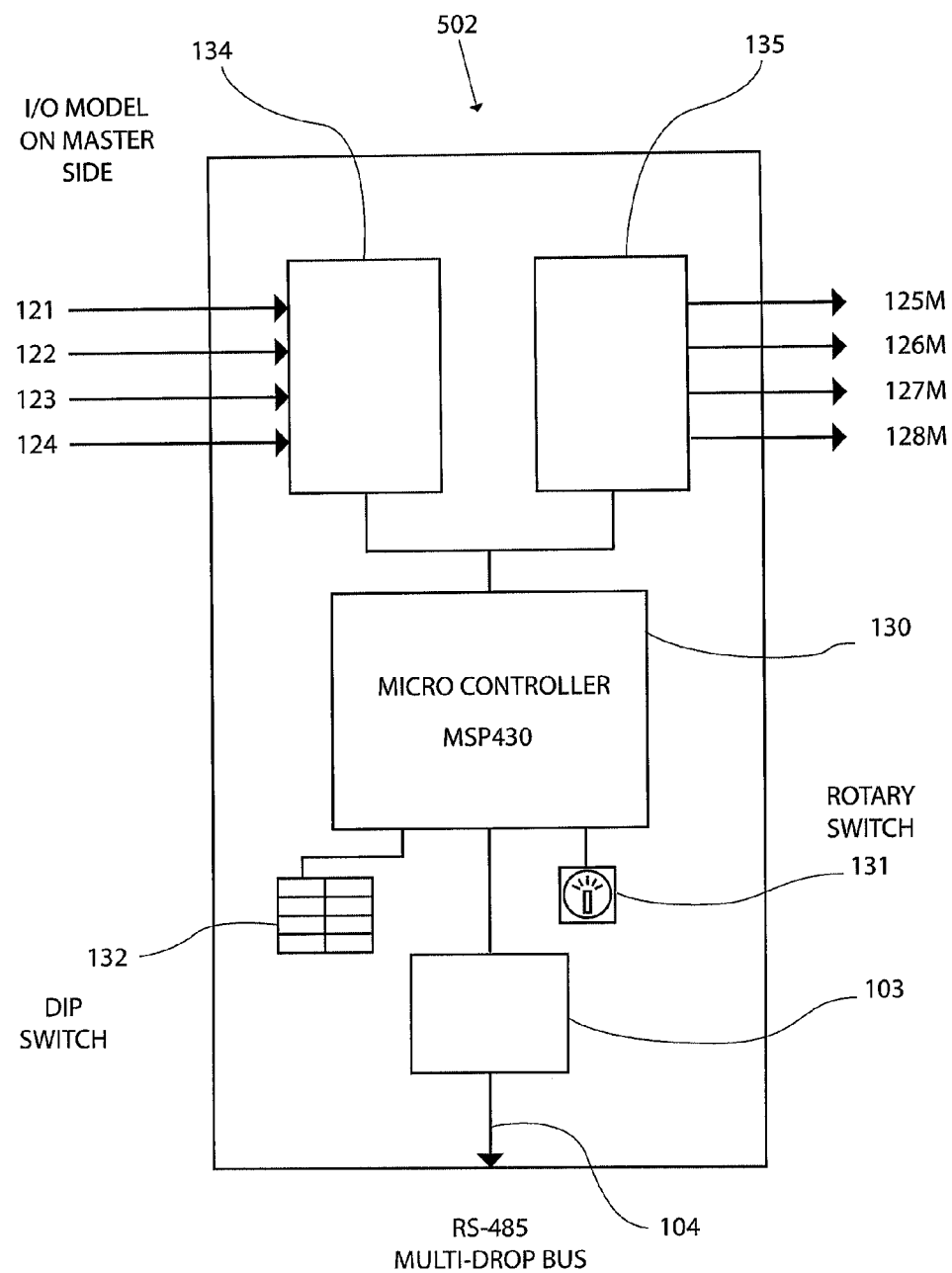
FIG. 4 shows a simplified block diagram of an I/O module that is compatible with the system of FIG. 1.

The I/O module seen in the block diagram FIG. 4 is a four-input/four-output unit 120 (only one input and one output of which are shown in the more simplified FIG. 1). This particular module is also controlled by firmware embedded in a TI MSP430 microcontroller 130 that is programmed and configured with firmware to carry out the actions of the I/O module. Four input signals 121, 122, 123, and 124, are received by signal conditioning and receiving circuitry 134 under the control of the programming of the microcontroller. This received data is made available over the multi-drop, sub-system, inter-connect bus 104 using the modules' protocol for mutual communication. Data sent to the module over the multi-drop bus is provided to output latching and signal conditioning circuitry 135 to be provided to output circuits 125M, 126M, 127M, and 128M.

In this example, a rotary switch 131 is used to determine a module address to uniquely identify each I/O module. DIP-switches 132 are used to indicate a desired output in a default or fail-safe condition. In the currently presented embodiment each output may be indicated to be set in one of three states upon a fail-safe state. One is "high", one is "low" and the other is the last known good transmitted state. This choice is made by a user via the setting of the appropriate DIP-switches.

Those knowledgeable in the field will understand that low and high can be taken to designate logical states of a digital signal and do not necessarily correspond to the actual magnitude of a voltage or current being higher or lower. In other modules analog signals may be supported and a different designation of the fail-safe electrical conditions may be required, for example, a particular voltage level or impedance. A multi-valued state could also be supported.

Operation

There are various phases of the operation that are generally common to the master and to the slave. They include installation, initialization, retrieving the state of the input signals to the I/O modules, transmitting the state of those input signals, receiving information about the other side's input signals, and sending that information to the appropriate I/O module for outputting. There are also various error-checking tasks performed.

Installation

Due to the packaging of the presently described embodiment, the installation of modules is simply performed by attaching them to a DIN 15 rail that has a passive RS 485 backplane 202. One controller module and up to sixteen I/O modules can be installed on the bus to create one end of a paired system. To complete the installation each I/O module's addressing rotary switch is set to a unique value, any fail-safe state choices are made and encoded in DIP-switches; and desired signaling wires are attached to terminal blocks.

Calling the first installed system the near end, these steps are repeated at the far end. One of the two ends is designated as a master and the other as a slave. That does not convey a particular sense of "importance" of signal direction or of designated location. It is merely a characteristic of the intra-unit communication protocol chosen in this embodiment.

Controllers at each end are paired units for mutual radio addressability. Also the I/O modules are compatible, inter-workable units at corresponding rotary switch addresses. That is, the I/O module at the near end with an address of 1 will exchange information with the I/O module set to address 1 at the far end and therefore must be compatible in order to provide a useful function. The radio modules used in this embodiment are Digi International XBee modules designed to operate using the IEEE 802.15.4 standard protocol. This standard is intended for so-called low-rate data transmissions.

In the case of a symmetric I/O module, as in the unit of FIG. 4, the near and far modules can be identical units. Another configuration option is to have units that both are described by FIG. 4 at a block diagram level but might have different signal levels. One proximate to a control station might be TTL logic levels while its, otherwise similar mate, might have opto-isolated current-based I/O levels. In that case a signal would track its corresponding signal but would not be strictly mirrored. Another example would be an inverting mirroring.

Another case of mated modules might be a far end module at address 2 with eight inputs and a mated near end module at address 2 with eight outputs. These would not be identical unit types, but they would be compatible units.

Initialization

On power on or hard reset, the system at each end will poll for I/O units on its half-duplex, multi-drop bus at addresses from 0 to 15. In this example embodiment the I/O modules respond in fixed time slots with fixed size packets. The time slots are initially determined by the rotary switch settings, higher addresses having a time slot after lower addresses. The controller can perform some system checks at this time to look for address conflicts as well as to make an internal map of the installed module types. The controller can also reassign module addresses for improved efficiency. These operations are done independently at both the near and far end.

General Continuous Operation

After the initializations, inter-system communication can proceed. The master directs a periodic burst of a transmission to the unique radio address of the slave in a unicast manner. In one mode this can be once per second. The burst will contain a header and a fixed size packet for each I/O module found installed by the master. These packets were previously retrieved by the controller from each respective I/O module over the multi-drop bus.

The slave, that has been waiting quietly for a transmission from the master, receives the periodic burst and breaks the received data into the header and a per I/O module fixed size packet. The local multi drop bus is used to send those packets to their respective modules. Based on their addresses the I/O modules receive those packets and use the information to mirror the master-end reflected signals.

To finish the symmetry of the mirrored system, the slave controller polls its I/O modules for their respective inputs, creates a composite data packet, and transmits it, addressed in a unicast fashion, to the master. As long as this is done before the master's next periodic transmission it should be readily received by the master with no conflict, flow control requirement, or other complex protocol requirements. The master receives this data and sends respective packets to its I/O modules.

Figure 5:
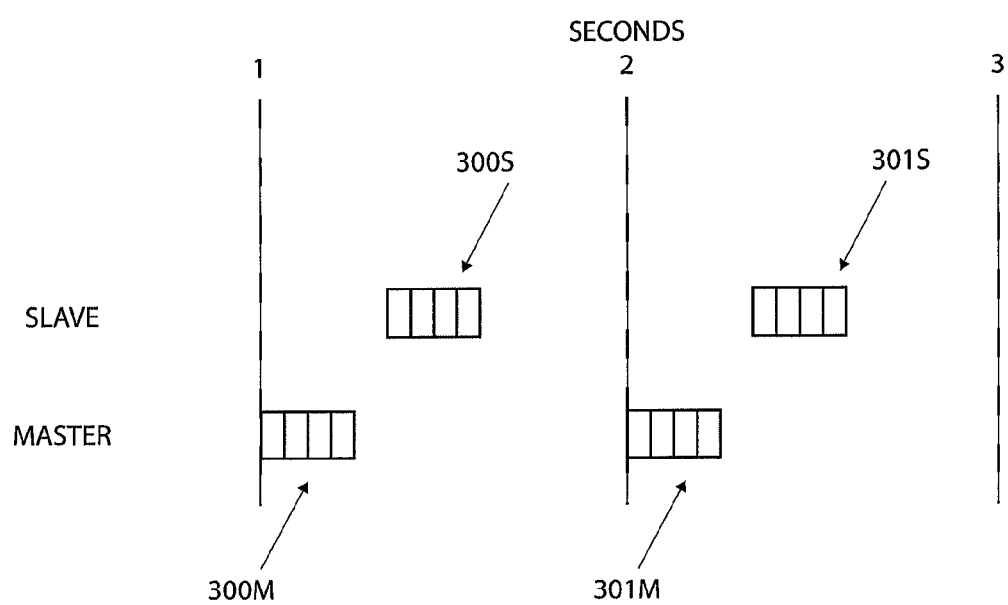
FIG. 5 shows a simplified view of the timing of packets exchanged between the ends of the paired system of FIG. 2.

FIG. 5 shows a simplified view of the transmissions. At one second intervals the master emits sequence-numbered data packets 300M, 301M. After receiving and processing each of these packets the slave end acquires its local I/O modules' data and responds by emitting a corresponding packet 300S, 301S. A time-quantized mirroring, as seen in FIGS. 6A and 6B, is a result of the periodic sampling and transmitting of the electrical input signals' states.

Figure 6A:
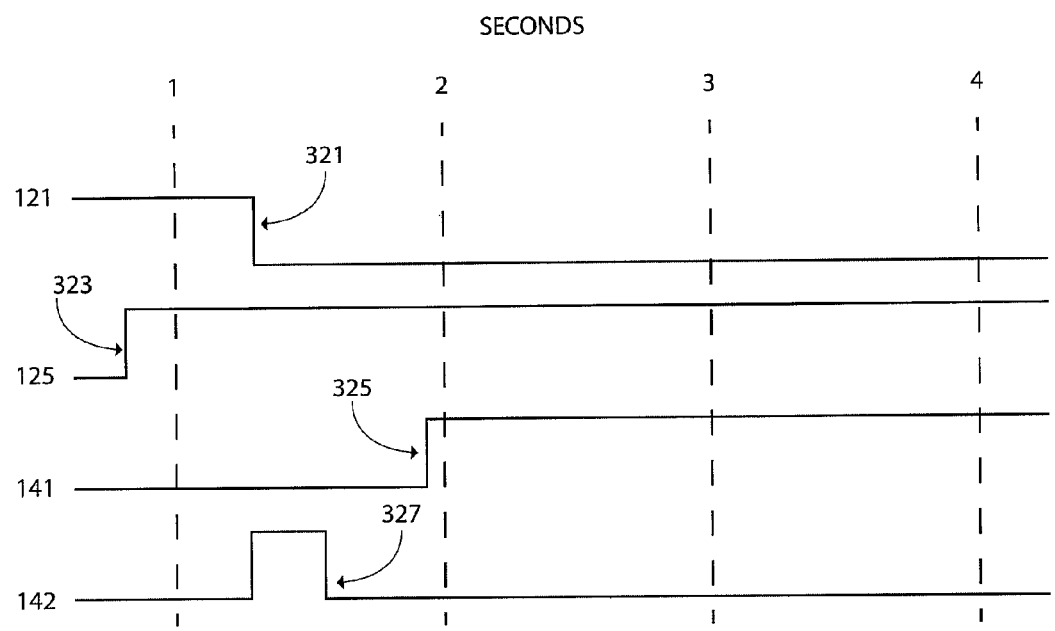
FIGS. 6A-6B show a hypothetical timing diagram of the local input and remote output signals seen in FIG. 1.
Figure 6B:
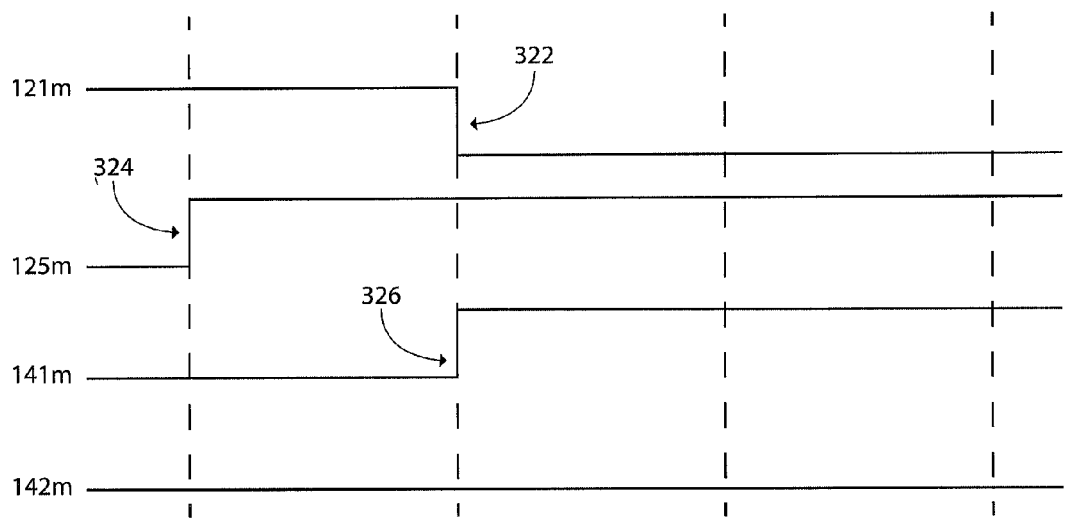

Using the signals of module 120 and 120' of FIG. 1 as an example, FIGS. 6A and 6B show the periodic sampling of local signals being turned into distant mirrored signals. FIG. 6A shows signals at their respective origination points and FIG. 6B shows the timing of the mirrored versions of those signals. Time marks represent seconds.

A transition labeled 321 engenders transition 322, transition 323 engenders transition 324, and transition 325 engenders transition 326. One thing to note is that a signal that changes more rapidly than the sample time can have a "transient" transition 327 that has no effect at the far end.

Master Operation

Figure 7:
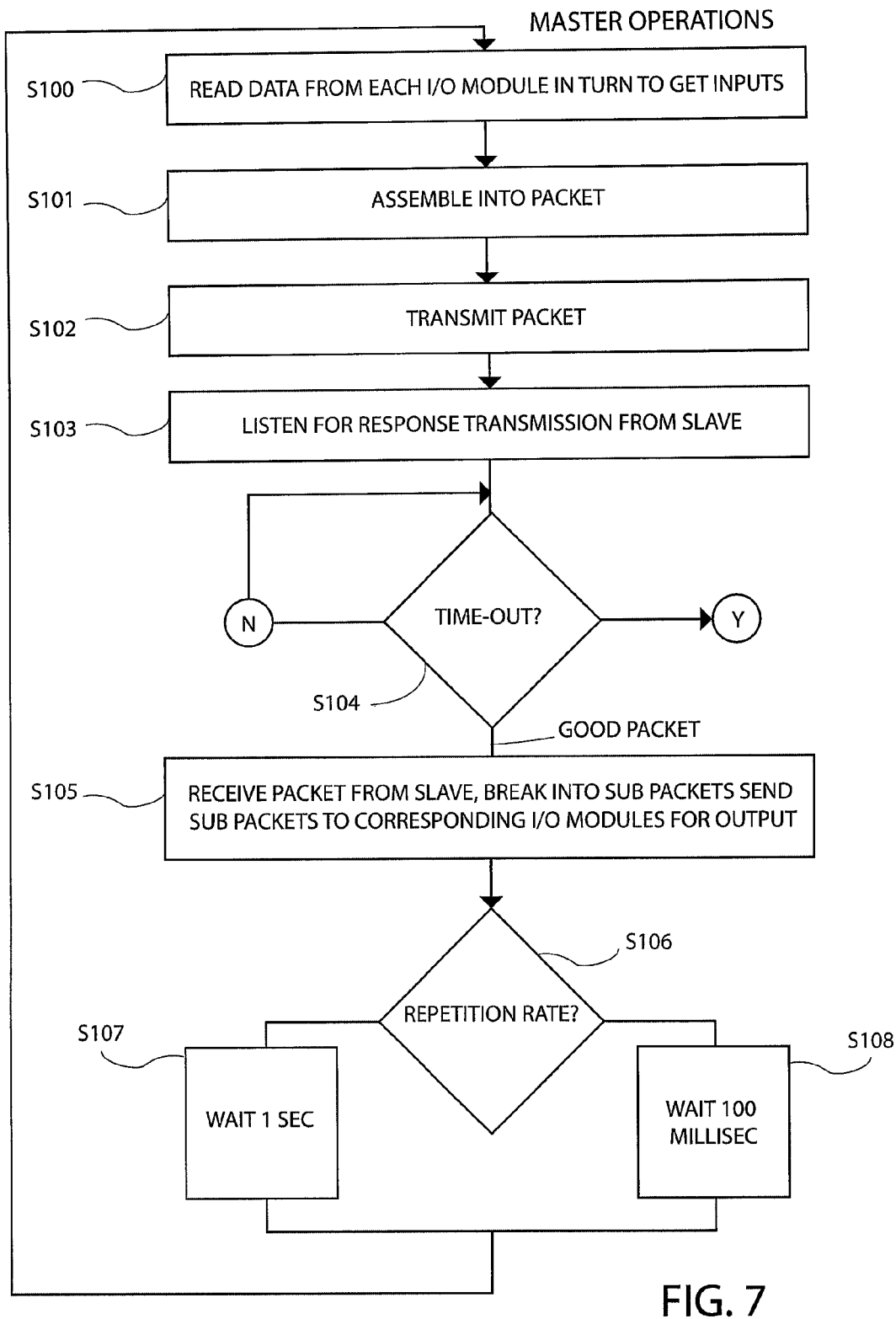
FIG. 7 is a flowchart of the actions of a master controller in the wireless cable replacement system of FIG. 1.

The flowchart of FIG. 7 shows a simplified view of the master's actions. In step S100 the controller polls its locally connected I/O modules. It receives a fixed size data packet from each installed module.

In step S101 the packets from the various I/O modules are compiled into a full packet for transmission including a header with addressing information, a sequence number and a map of the state of that end of the system. In the present example the data is encrypted with keys that are configured into the controllers at the time of manufacturing.

The controller then sends this assembled packet to the radio module via a serial bus. The radio module then sends the packet over the air S102. The radio is one of many radio module types made by Digi International. Digi offers a variety of radio modules differing in RF frequencies and transmission types, but having a common form-factor and system side interface. This allows variations of the present embodiment with interchangeable radio types. Options include frequency hopping, spread spectrum, etc. Of course, both ends of a point-to-point system will have mutually inter-workable radios.

After transmitting, the master end is available to receive S103, the corresponding response from its associated slave. During this time, a time-out period is calculated S104. If no proper response is received after a predetermined time, then control is sent to a fail-safe sequence shown in FIG. 9.

When a proper and timely packet is received from the slave, it is broken up into sub-packets, each sent S105 to a respective I/O module over the local multi-drop bus. The header packet can also be checked for proper sequence number and other configuration compatibility.

As the master, this sequence of actions determines the periodicity of system-wide transmission. In this embodiment there are two rates of transmission. As mentioned above, one of the options is once per second. This option can be very valuable for slowly changing signals. Battery life and airtime congestion are both conserved. However if signals are changing more rapidly, or if reduced latency is desired, the unit can be set in a "fast" mode. The mode is toggled by the push button 111 shown in FIGS. 1, 2, and 3. In the fast mode the repetition rate depends upon the number of I/O modules installed. With only one module the repetition rate is every 100 milliseconds. As more modules are added the "fast" rate approaches the slow rate's one-second value.

A determination is made S106 as to the unit being in a fast or a slow repetition rate state. Next, an appropriate delay S107, S108 is inserted. After the delay, the sequence is re-entered.

Slave Operation

Figure 8:
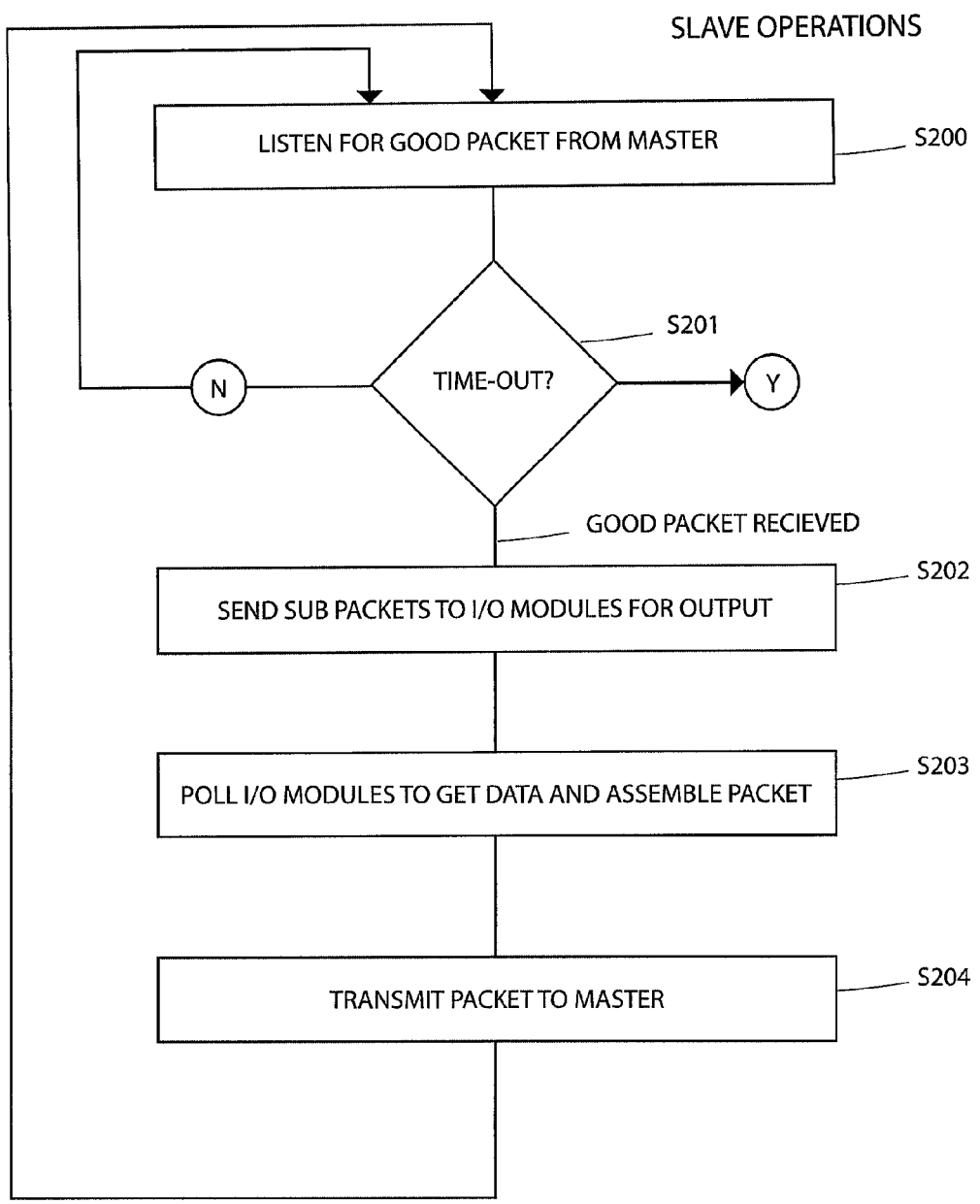
FIG. 8 is a flowchart of the actions of a slave controller in the wireless cable replacement system of FIG. 1.

FIG. 8 is a flowchart of the operation of the controller at the slave end. Its operation is complementary with that of the master to achieve the system-wide results.

In an initial step the slave listens for a good unicast packet addressed to it from its paired master S200. That process continues S201 until a time-out occurs or a good packet is received. Upon receiving a good and timely packet, it is broken into sub-packets and delivered to the respective I/O modules S202 over the local multi-drop bus for outputting.

Next, the I/O modules are polled in turn by the controller to get their respective input data and assemble into a packet for transmission S203. The controller sends that packet data to the radio module. The radio then transmits S204 the packet over the air addressed to the paired master. After a transmission, the slave returns to the waiting step.

Time-Out and Tampering Operation

The detection of an interruption in a sequence or series of transmitted packets or a break in valid transmissions is not always black and white but can involve heuristics. A packet that arrives earlier or later than expected, a packet with an out-of-order sequence number or a change in signal strength can all contribute to a suspicion of tampering, interference, or technical failure. Although not always correctly, logic in the controller can conclude that a third party tampering or jamming attempt is occurring, a technical failure has occurred, or that normal operations are proceeding.

A fail-safe or default condition can be initiated by these decisions occurring in the controller or possibly in individual I/O modules. In some embodiments it may be possible and valuable to attempt to distinguish between "innocent" failures and various types of third party attacks and for an embodiment to take differing actions under differing circumstances.

Figure 9:
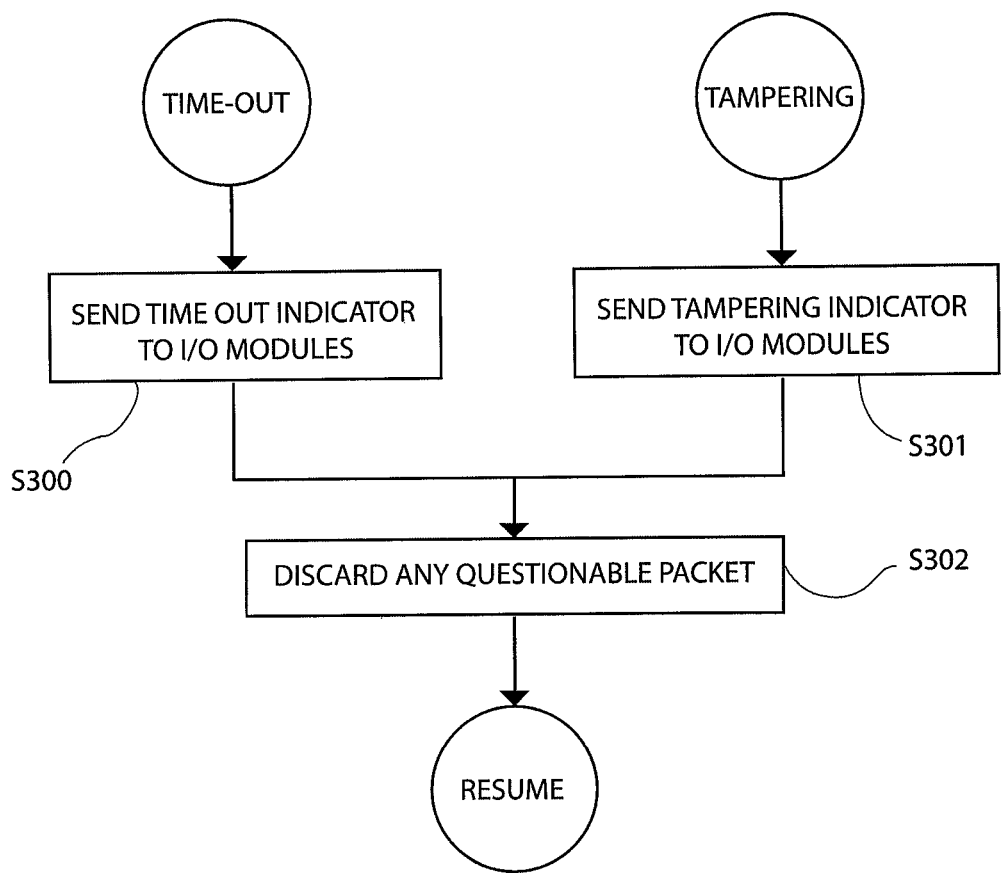
FIG. 9 is a flow chart of a handling of exception conditions for both master and slave operations shown respectively in FIG. 7 and FIG. 8.

The flowcharts of FIGS. 7 and 8 show an exiting path in the case of a time-out. FIG. 9 is a very simplified view of the flow of actions from that point and shows the response to a time-out event. It also shows optional steps in the case of a tampering detection. A tampering detection could be assumed if there are excessive over-the-air collisions, possibly indicative of a jamming denial of service attack. It might be assumed based on out-of-sequence packets that might be from a playback attack. Some embodiments may also have detection of some forms of physical tampering. Tampering suspicion is a second flow shown in FIG. 9.

A time-out flow from either FIG. 7 or 8 is directed to step S300 in FIG. 9 and a tampering detection (not shown in the other flowcharts) would lead to step S301, also seen in FIG. 9.

Time-out and many tampering determinations would be made by logic operating in the controller. These determinations need to be communicated to the various I/O modules to direct them to take appropriate action. Header information in packets directed to each I/O module will indicate a time-out occurrence in step S300 or a suspected tampering in step S301. Each module can take action, or not, on this information.

Common to both paths, in step S302 any questionable packets are discarded and then operations are resumed.

Additional Robustness Feature

One category of attack or error that can interfere with operation involves a radio module getting into an unresponsive state. Logic in the controller portion can detect this unresponsiveness and control a signal to perform a hard reset of the radio module. Alternately, the controller portion could control power to the radio module and accomplish a full re-initialization by power cycling the radio.

I/O Module Operation

Figure 10A:
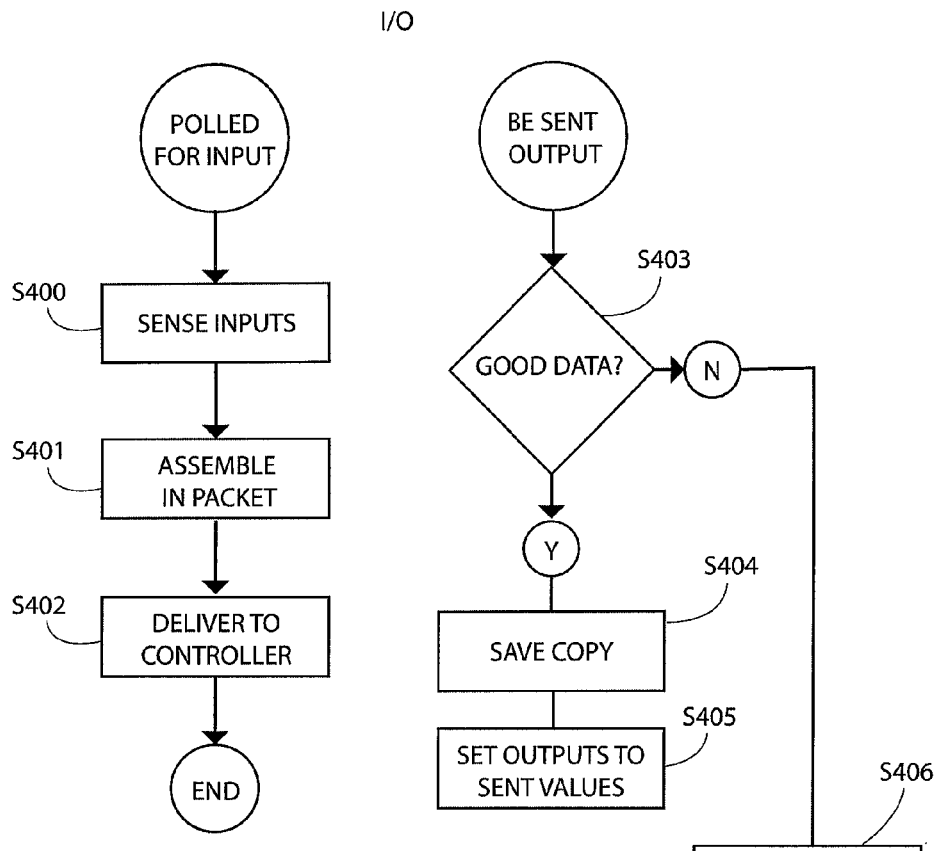
FIGS. 10A-10B are flowcharts of the actions of the bi-directional I/O module of FIG. 4.
Figure 10B:
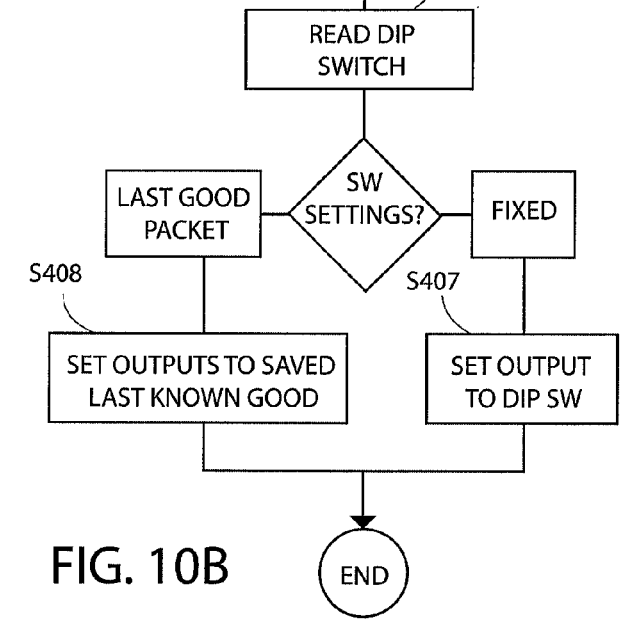

FIGS. 10A and 10B show flowcharts of the high-level operation of an I/O module like the one of FIG. 4. When polled for its received input, the module senses the state of its inputs S400, assembles a packet representing that data S401, and sends a packet to the controller S402 over the local multi-drop bus.

Separately, when an I/O module receives the packet over the multi-drop bus it then determines if it is a good packet S403 as seen in FIG. 10B. The packet may contain a time-out code or a tampering code from the controller. Also, the I/O module may have its own end-to-end tampering or problem detection between it and its other-end mate.

If it is a good packet, in step S405 it sets the output circuit to the electrical states dictated by the packet's data. Optionally it also stores this as a last-known good packet S404. In I/O modules with a fail-safe feature, a time-out or a tampering detection can cause the I/O module to set its various outputs to a fail-safe state based on settings. In that case, in step S406 the DIP-switches are read and a termination is made to either set each output to a preset electrical state, or to set it to a last know good value. Assuming those values are stored locally in the I/O module in step S404, the outputs can be set to those values.

Ease of Configuration

There are several factors that contribute to a so-called "zero configuration" system. One factor is the use of a point-to-point system. This avoids the problems of complicated networks and particularly it eliminates many configuration issues. Another is a simple method pairing of units to know each other's address. This can be done by programming during manufacturing and providing them in pre-paired units. It can also be accomplished by other methods in the field that are presented below. Since this system is modular with one controller supporting several plug-in I/O modules, there is also a need to provide the controller with a mechanism to direct to and from each I/O module. In the currently presented embodiment this is done by rotary switches on the I/O modules that are set to unique values.

Some systems, like the embodiment presented, support a default, fail-safe output state for each output. To do this in a rich manner can be accomplished by software settings. In this embodiment, these states are set by mechanical switches on the I/O modules, avoiding software setup.

Indications of fault can also be an area for configuration. One very simple way to accomplish this with the presently described embodiment is to tie one input at the remote end to ground, or leave open if the signal type permits. At the control-room end the signal will be normally continually low. However, if the "fail-safe" state of that output is set to high, failure or attack will force it to a high state by the normal operation of the system. Heuristics can be used to attempt to distinguish tampering attempts from other conditions.

Variations

In versions of this embodiment the radio circuitry might be integrated with the controller circuitry rather than being a modularized, replaceable unit. In versions of the embodiment the modules may not conform to DIN 15 mounting specifications. Versions might use a daisy-chained bus between modules rather than a passive backplane.

Pairing of units and assignment of master/slave roles can be done in the field rather than by factory settings. Versions can completely free of requiring software settings or comprise both software settings and local physical switch settings.

I/O modules can be intelligent rather than just reproducing signals at a distance. For example an I/O module could have circuitry for direct connection to specific sensors. Or an I/O module could include a PID. In the case of an intelligent output module the concept of fail-safe would be more complicated but still constitute a valuable feature.

Alternate Embodiment

An alternate embodiment has the controller and input/output functions commonly packaged rather than modularized. A variation on this embodiment would have the radio separately packaged and cabled to the main unit.

These teachings may be susceptible to various modifications and alternative forms; specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

It must be noted that as used herein and in the appended claims, the singular forms "a", "an", and "the" include plural referents unless the context clearly dictates otherwise.

It is claimed:

1. A wireless-to-wire subsystem comprising:
   (a) a controller having a radio module port adapted to connect to a radio module, the controller comprising logic circuitry to receive a sequence of data packets over the radio module port, the data packets further comprising at least one data field encoding a signal value; the controller comprising logic for detecting an interruption of the sequence of data packets and the controller further comprising a subsystem interconnect bus;
   (b) at least a first I/O module comprising at least one physical switch and circuitry emitting at least one electrical output signal, the first I/O module adapted to communicate with the controller via the subsystem interconnect bus where communication comprises the first I/O module receiving at least a portion of the data fields of the sequence of the data packets from the controller;
the first I/O module further comprising logic circuitry configured to reflect the encoded value in a first data field to a first output signal, and to update the value of the first output signal repeatedly as data packets are received; and
further, the subsystem configured to force the first output signal to a default state associated with the first output signal upon detection of an interruption of the sequence of data packets by the controller; the default state associated with the first output signal being determined by the settings of the at least one physical switch, a first setting indicating a first predetermined electrical state, a second setting indicating a second predetermined electrical state, and a third setting designating the default state as the state that was encoded in the first data field of the last packet received prior to the interruption.

2. The wireless-to-wire subsystem of claim 1 where at least some data packets further comprise a second data field and the at least one I/O module further comprises circuitry emitting a second output signal associated with the second data field, the second output signal having a respective associated default state independently determined by the at least one switch from that of the default state associated with the first output signal.

3. The wireless-to-wire subsystem of claim 1 where the at least one I/O module further comprises:
 (a) circuitry configured to receive at least one electrical input, and
 (b) logic circuitry adapted to encode the value of a first of the at least one electrical inputs into a data field of an outgoing data packet and to present the outgoing data packet to the radio module port for transmission.

4. The wireless-to-wire subsystem of claim 1 where at least a portion of some of the data packets comprise encrypted data.

5. The wireless-to-wire subsystem of claim 1 where the controller has circuitry to control the power fed to the radio module port and is configured to use that facility to power cycle an attached radio module in cases when an attached radio module is not responsive to the controller.

6. The wireless-to-wire subsystem of claim 1 where the first I/O module and the controller are packaged physically distinct from each other and where each package has an external connector conveying the subsystem interconnect bus.

7. The wireless-to-wire subsystem of claim 6 further comprising a passive backplane configured to operationally couple to the external connectors.

8. The wireless-to-wire subsystem of claim 1 further comprising a radio module operatively coupled to the radio module port.

9. The wireless-to-wire subsystem of claim 8 where the controller is adapted to configure the radio module for point-to-point communication.

10. The wireless-to-Wire subsystem of claim 8 where the radio module is adapted for communication using an IEEE 802.15.4 protocol.

11. A system comprising the wireless-to-wire subsystem of claim 1 and an operatively compatible wire-to-wireless subsystem, the wire-to-wireless subsystem comprising:
 circuitry configured to receive an electrical input signal;
 logic circuitry configured to encode the value of the electrical input signal and to include the encoded value in an outgoing data packet and to initiate the outgoing data packet to be transmitted to the wireless-to-wire subsystem.

12. The system of claim 11 where the wire-to-wireless subsystem and wireless-to-wire subsystem communicate using a point-to-point master/slave protocol with one system acting as a master and the other system acting as a slave.

13. The system of claim 12 where the system operating as a master has at least two, user selectable, periodic repetition rates, with the user's selection mediated by a physical switch located within at least one of the subsystems.

14. The system of claim 13 where the wire-to-wireless subsystem and the wireless-to-wire subsystem each, respectively, comprise: electrical signal receiving circuitry, electrical signal emitting circuitry and are each configured to transmit packets containing encodings of received signals to the other subsystem and are each also configured to receive packets from the other subsystem containing encoded signals to be emitted; whereby bi-directional signal mirroring is provided.

15. A method for causing an emitted electrical signal from a first system, comprising physical switches, to follow the state of an electrical signal received by a distinct second system, the method comprising, the first system:
 (a) receiving a series of unicast data packets transmitted by the second system via a radio receiver in the first system, the unicast data packets containing at least a first data field representing the state of the electrical signal received by the second system;
 (b) updating the state of the emitted electrical signal to correspond with the state of the electrical signal represented in the first data field; and
 (c) detecting a break in the series of the unicast data packets, and when a break is detected:
 (d) forcing the emitted electrical signal to a default state; the default state being determined by the settings of at least one of said physical switches located in the first system where a first setting signifies a first predetermined state, a second setting signifies a second predetermined state, and a third setting signifies the default state to be the state that was represented in the first data field of the last of the series of unicast data packets received prior to the break in the series of data packets.

16. The method of claim 15 where at least a portion of some of the data packets are encrypted.

17. The method of claim 15 where at least some packets contain at least a second distinct data field and the first system comprises an associated second distinct emitted signal, the updating and forcing steps being carried out independently with respect to the second data field and the associated second emitted signal, the second emitted signal having independent default state switch settings.

18. The method of claim 15 where the detecting is accomplished heuristically.

19. The method of claim 15 where the detecting is at least partially based on untimely arrival of received transmissions.

20. The method of claim 15 further comprising:
 signaling, externally the detection of an anomaly detected in receiving, the
 signaling distinguishing suspected attack from suspected technical failure.

* * * * *